US009850936B2

(12) United States Patent
Tanabe

(10) Patent No.: US 9,850,936 B2
(45) Date of Patent: Dec. 26, 2017

(54) MOUNTING STRUCTURE FOR MOUNTING COMPONENT

(71) Applicant: HONDA MOTOR CO., LTD., Tokyo (JP)

(72) Inventor: Gen Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 14/940,844

(22) Filed: Nov. 13, 2015

(65) Prior Publication Data

US 2016/0290383 A1 Oct. 6, 2016

(30) Foreign Application Priority Data

Sep. 30, 2014 (JP) .................................. 2014-200011

(51) Int. Cl.
*F16B 37/00* (2006.01)
*F16B 37/02* (2006.01)
*F16B 37/04* (2006.01)
*F16B 5/02* (2006.01)

(52) U.S. Cl.
CPC ................ *F16B 37/02* (2013.01); *F16B 5/02* (2013.01); *F16B 37/044* (2013.01)

(58) Field of Classification Search
CPC .. F16B 5/02; F16B 37/00; F16B 37/02; F16B 37/04; F16B 37/044
USPC .................................. 411/103, 104, 108, 111
See application file for complete search history.

(56) References Cited

U.S. PATENT DOCUMENTS

| 4,875,816 A * | 10/1989 | Peterson | F16B 37/043 411/104 |
| 5,507,610 A * | 4/1996 | Benedetti | F16B 5/0628 24/297 |
| 5,558,369 A * | 9/1996 | Cornea | F16B 37/044 280/781 |
| 6,715,185 B2 * | 4/2004 | Angellotti | F16B 5/065 24/297 |

(Continued)

FOREIGN PATENT DOCUMENTS

| JP | 2011-122687 A | 6/2011 |
| WO | WO 2008/157265 A1 | 12/2008 |

*Primary Examiner* — Roberta Delisle
(74) *Attorney, Agent, or Firm* — Birch, Stewart, Kolasch & Birch, LLP

(57) ABSTRACT

A mounting structure includes a holding portion with a housing space for a mounting component. The holding portion includes a side wall portion upstanding from a base portion, and a seat portion being continuous with a top of the side wall portion and having a bolt through hole into which a bolt is inserted. A mounting component insertion hole is provided in the side wall portion for inserting the mounting component into the housing space. The bolt through hole abuts on the peripheral surface of the cylindrical portion of the mounting component. A communication portion provides communication between the bolt through hole and the mounting component insertion hole, for allowing passage of the cylindrical portion of the mounting component into the bolt through hole. Restrictions form a narrow portion in the communication portion, the narrow portion being narrower than the outer dimension of the cylindrical portion of the mounting component.

12 Claims, 6 Drawing Sheets

(56) References Cited

U.S. PATENT DOCUMENTS

| | | | |
|---|---|---|---|
| 6,854,941 B2* | 2/2005 | Csik | F16B 37/044 411/111 |
| 7,178,855 B2* | 2/2007 | Catron | B60J 5/0468 24/297 |
| 7,927,050 B2* | 4/2011 | Koike | F16B 5/0628 411/104 |
| 8,353,649 B2* | 1/2013 | Csik | F16B 37/045 411/108 |
| 8,979,156 B2* | 3/2015 | Mally | F16B 5/0657 24/297 |
| 2008/0181745 A1* | 7/2008 | Naik | F16B 21/09 411/107 |
| 2009/0103997 A1* | 4/2009 | Csik | F16B 37/045 411/112 |

* cited by examiner

MOUNTING STRUCTURE FOR MOUNTING COMPONENT

CROSS-REFERENCE TO RELATED APPLICATIONS

The present application claims priority under 35 USC 119 to Japanese Patent Application No. 2014-200011 filed Sep. 30, 2014 the entire contents of which are hereby incorporated by reference.

BACKGROUND OF THE INVENTION

1. Field of the Invention

The present invention relates to a mounting structure for a mounting component (for example, a nut).

2. Description of Background Art

A mounting structure for a mounting component is known. See, for example, JP-A No. 2011-122687. The mounting structure is provided with a mounting component (4); and a first member (1) that has a holding portion (10) for holding the mounting component (4) and to which a second member (32) is mounted by the mounting component (4). The holding portion (10) has a housing space (16) for the mounting component (4), which is formed with a base portion (21), a side wall portion (10b) upstanding from the base portion (21), and a seat portion (10a) being continuous with the top of the side wall portion and having a bolt through hole (13) into which a bolt (31) can be inserted. A mounting component insertion hole (15) is provided in the side wall portion for inserting the mounting component (4) into the housing space (16).

In the above-described known mounting structure for the mounting component, the mounting component (4) housed in the housing space (16) is prevented from falling from the mounting component insertion hole (15) by pinching the mounting component between the top surface of rail-shaped protrusions (17, 17) provided on L-shaped supporting pieces (18, 18), and the back surface (10c) of the seat portion.

Therefore, the holding portion (10), including the L-shaped supporting pieces (18, 18) and the seat portion, requires an increase in accuracy (especially the accuracy in the height direction).

SUMMARY AND OBJECTS OF THE INVENTION

Accordingly, an object of an embodiment of the present invention is to provide a mounting structure for a mounting component, wherein a holding portion need not necessarily have a higher accuracy.

In order to address the above-mentioned problem, according to an embodiment of the present invention, a mounting structure for a mounting component is provided with a mounting component that has a cylindrical portion, and a radially enlarged portion radially enlarged at one end of the cylindrical portion. A first member has a holding portion holding the mounting component and to which a second member is mounted by the mounting component.

According to an embodiment of the present invention, the holding portion has a housing space for the mounting component, the housing space being formed with a base portion, a side wall portion upstanding from the base portion, and a seat portion being continuous with the top of the side wall portion and having a bolt through hole into which a bolt is inserted. A mounting component insertion hole is provided in the side wall portion for inserting the mounting component into the housing space.

According to an embodiment of the present invention, the bolt through hole is of such size so as to abut on a peripheral surface of the cylindrical portion of the mounting component. The holding portion is provided with a communication portion that provides communication between the bolt through hole and the mounting component insertion hole, for allowing passage of the cylindrical portion of the mounting component into the bolt through hole. According to an embodiment of the present invention, restrictions form a narrow portion in the communication portion, the narrow portion being narrower than an outer dimension of the cylindrical portion of the mounting component.

According to an embodiment of the present invention, with the mounting structure for the mounting component, the cylindrical portion of the mounting component is passed through the mounting component insertion hole and the communication portion and pushed through the restrictions into the bolt through hole, thereby enabling the mounting component to be held in the holding portion.

According to an embodiment of the present invention, the held mounting component is prevented from falling by the restrictions.

Therefore, with the mounting structure for the mounting component, the mounting component can be prevented from falling by a simple structure, and therefore the holding portion need not necessarily have a high accuracy.

According to an embodiment of the present invention, the mounting structure for the mounting component may be configured such that the seat portion is provided with lightening portions close to the restrictions.

This configuration allows easy deformation of the restrictions and easy insertion of the cylindrical portion into the bolt through hole.

According to an embodiment of the present invention, the mounting structure for the mounting component may be configured such that a pair of the restrictions and a pair of the lightening portions are provided so as to sandwich the communication portion therebetween.

This configuration allows uniform deformation of the restrictions.

According to an embodiment of the present invention, the mounting structure for the mounting component may be configured such that receiving portions for receiving the radially enlarged portion of the mounting component are formed at locations overlapping the lightening portions when viewed from an axial direction of the bolt through hole.

With this configuration, the bolt through hole and the lightening portions can be molded at the same time by molding dies that move in the axial direction of the bolt through hole. Thus, the receiving portions for receiving the radially enlarged portion of the mounting component can be also molded at the same time.

Furthermore, the portion other than the receiving portions can be made open, thereby allowing a reduction in the weight of the first member.

According to an embodiment of the present invention, the mounting structure for the mounting component may be configured such that, in the housing space, the position in the height direction of the radially enlarged portion of the mounting component is restricted by an inside surface of the seat portion and inside surfaces of the receiving portions.

This configuration eliminates the need for a shelf portion, such as the L-shaped supporting pieces (18, 18) in JP-A No.

2011-122687, thereby allowing a reduction in the height (the size in the axial direction of the bolt through hole) of the holding portion accordingly.

According to an embodiment of the present invention, the mounting structure for the mounting component may be configured such that the radially enlarged portion of the mounting component is a rectangular square nut with the side wall portion being disposed along three sides of the square nut.

With this configuration, the rotation of the mounting component is restricted by three sides of the side wall. Thus, the co-rotation of the mounting component at the time of bolt fastening work can be excellently prevented.

According to an embodiment of the present invention, in the mounting structure for the mounting component, the first member may be configured so that the holding portions are formed on front and back surfaces of the base portion and disposed below a seat of a saddle-ride type vehicle with the electric components serving as the second member being mounted on the front and back surfaces.

With this configuration, the distributed arrangement between the front surface and back surface of the base portion depending on the electric component is facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1(a) and 1(b) illustrate a mounting structure for a mounting component according to an embodiment of the present invention, wherein FIG. 1(a) is a plan view, and FIG. 1(b) is a perspective view of a holding portion;

FIGS. 3(a) and 3(b) illustrate the mounting component, wherein FIG. 3(a) is a plan view, and FIG. 3(b) is a front view;

DETAILED DESCRIPTION OF THE PREFERRED EMBODIMENTS

Figure 1A:
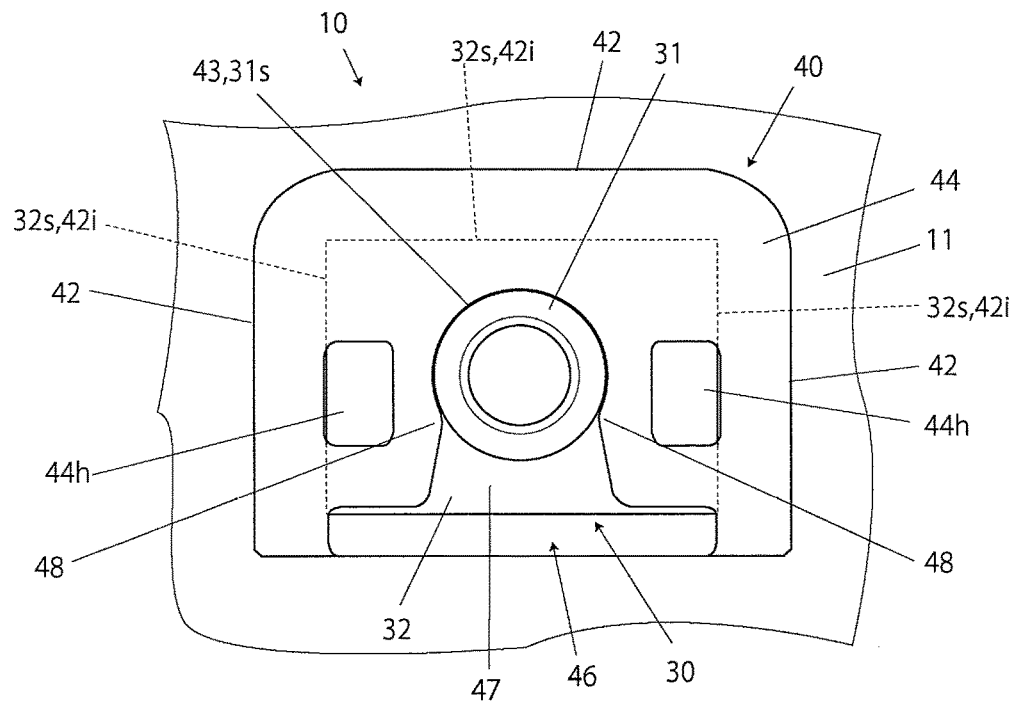

Hereinafter, a mounting structure for a mounting component according to an embodiment of the present invention will be described with reference to the accompanying drawings. It is to be noted that the drawings shall be viewed in the direction of reference signs, and in the following description, the terms, front, rear, left, right, top, and bottom, refer to the directions viewed from a rider. In the drawings, Fr indicating the front of the vehicle, Rr indicating the rear of the vehicle, L indicating the left side of the vehicle, R indicating the right side of the vehicle, U indicating the upside of the vehicle, and D indicating the downside of the vehicle are shown when needed. In the drawings, like reference signs denote like parts or corresponding parts.

As shown in FIG. 1(a), the mounting structure for the mounting component according to this embodiment is provide with a first member 10 and a mounting component 30.

The first member 10 has a holding portion 40 that holds the mounting component 30.

Figure 4:
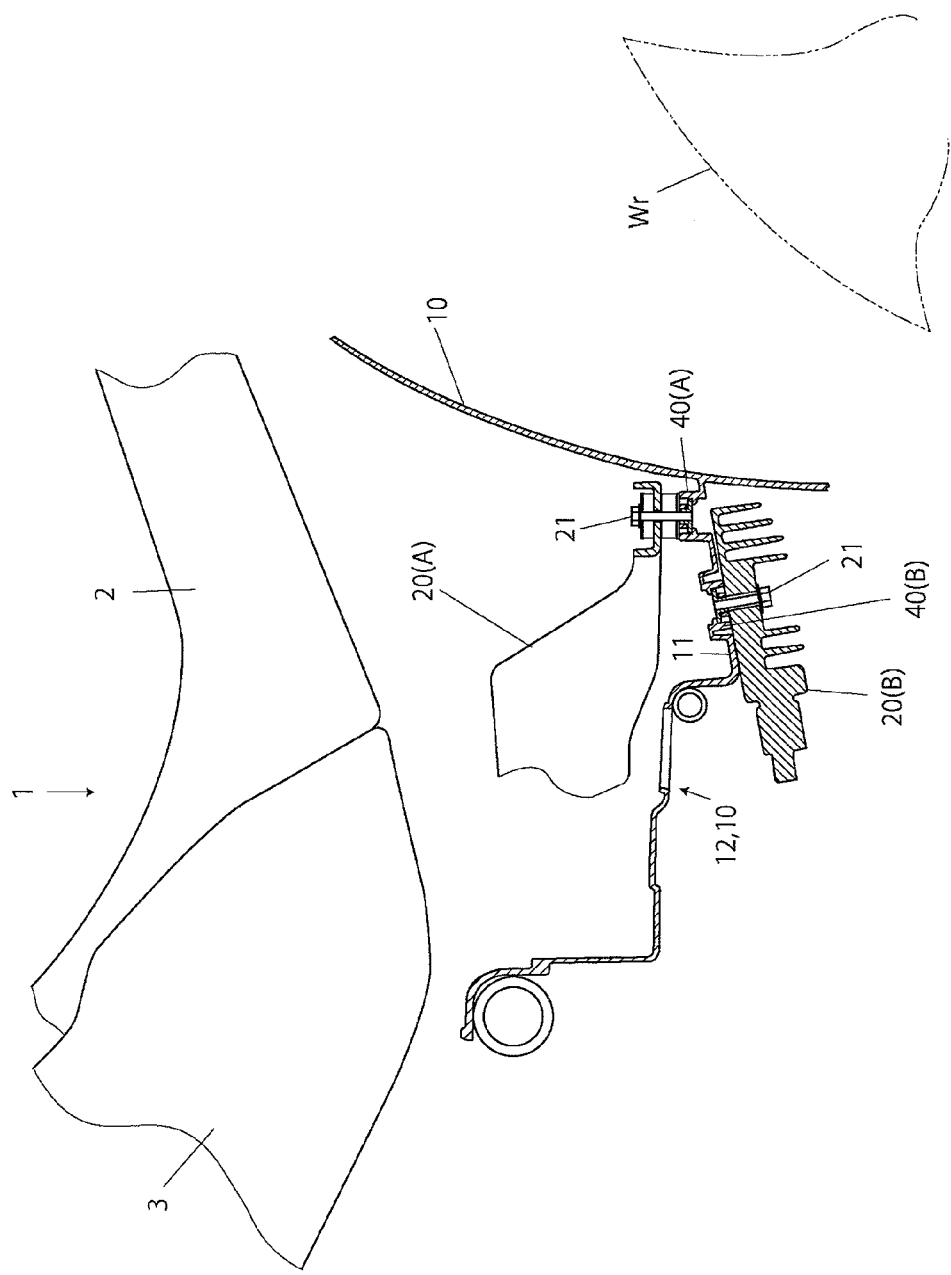
FIG. 4 is a fragmentary sectional side view showing an example of a saddle-ride type vehicle in which the mounting structure for the mounting component according to the embodiment of the present invention is used.

A second member 20 (see 20(A) and 20(B) in FIG. 4) is mounted to the first member 10 by the mounting component 30.

Figure 3A:
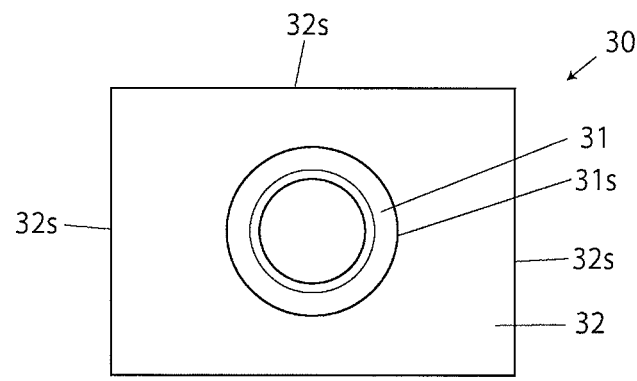
Figure 3B:
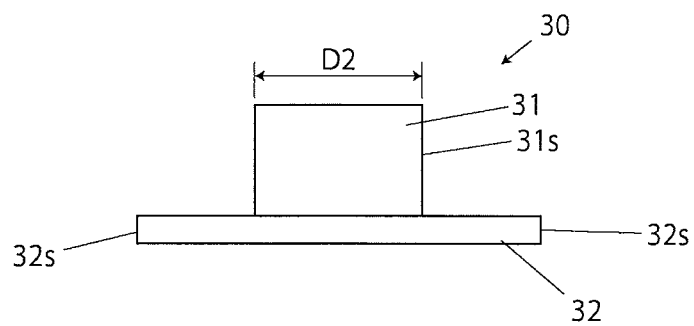

As shown in FIGS. 3(a) and 3(b), the mounting component 30 has a cylindrical portion 31 and a radially enlarged portion 32 that is radially enlarged at one end of the cylindrical portion 31. The mounting component 30 is configured from, for example, a square nut.

As shown FIGS. 1(a) to 2(b), the holding portion 40 of the first member 10 has a housing space 45 for the mounting component 30. The housing space 45 is formed with a base portion 11; a side wall portion 42 upstanding from the base portion 11; and a seat portion 44 being continuous with the top of the side wall portion 42 and having a bolt through hole 43 into which a bolt 21 (see FIG. 4) is inserted.

The holding portion 40 has a mounting component insertion hole 46 that is provided in the side wall portion 42 for inserting the mounting component 30 into the housing space 45.

Figure 2A:
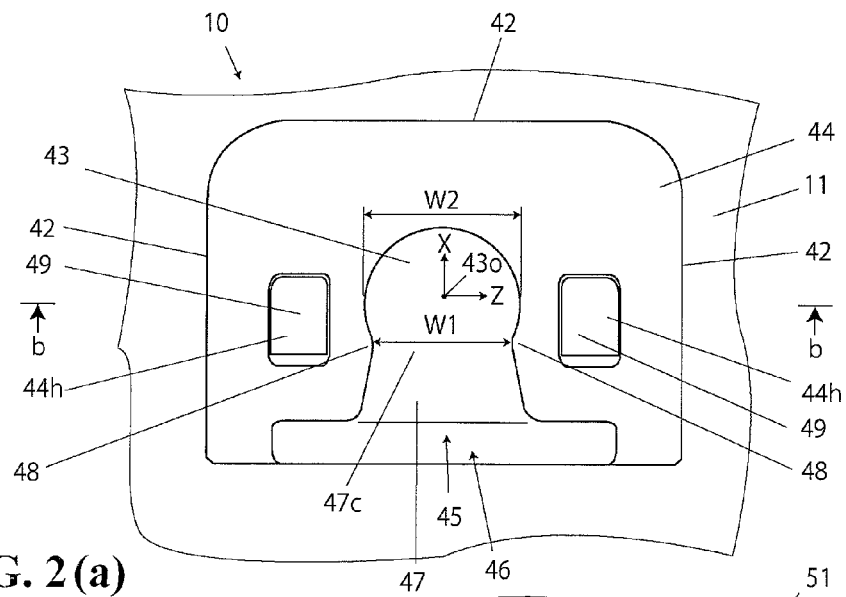
FIG. 2(a) is a sectional view of the holding portion.

The bolt through hole 43 is of such size as to abut on a peripheral surface (side surface) 31s of the cylindrical portion 31 of the mounting component 30. In FIG. 2(a), the size (diameter) of the bolt through hole 43 is denoted by W2.

As shown in FIG. 2(a), the holding portion 40 is provided with a communication portion 47 for providing communication between the bolt through hole 43 and the mounting component insertion hole 46, for allowing passage of the cylindrical portion 31 of the mounting component 30 into the bolt through hole 43; and restrictions 48 for forming a narrow portion 47c, the narrow portion 47c being narrower than the outer dimension D2 (see FIG. 3(b)) of the cylindrical portion 31 of the mounting component 30. In FIG. 2(a), the width of the narrow portion 47c is denoted by W1. It should be noted that W1<D2<W2 is established.

With the mounting structure for the mounting component 30, the cylindrical portion 31 of the mounting component 30 is passed through the mounting component insertion hole 46 and the communication portion 47 and pushed through the restrictions 48 (the narrow portion 47c) into the bolt through hole 43, thereby enabling the mounting component 30 to be held in the holding portion 40.

The held mounting component 30 is prevented from falling by the restrictions 48 (the narrow portion 47c).

Therefore, with the mounting structure for the mounting component, since falling of the mounting component 30 can be prevented by a simple structure, the holding portion 40 need not necessarily have a high accuracy.

In this embodiment, a pair of the restrictions 48 are provided along the bolt through hole 43. The narrow portion 47c of the communication portion 47, in a plan view, is formed between the pair of restrictions 48.

As shown in FIGS. 1(a), 1(b), 2(a) and 2(b), the seat portion 44 is provided with lightening portions 44h close to the restrictions 48.

This configuration allows easy deformation of the restrictions 48 (easy expansion of the narrow portion 47c) and easy insertion of the cylindrical portion 31 of the mounting component 30 into the bolt through hole 43.

Figure 2B:
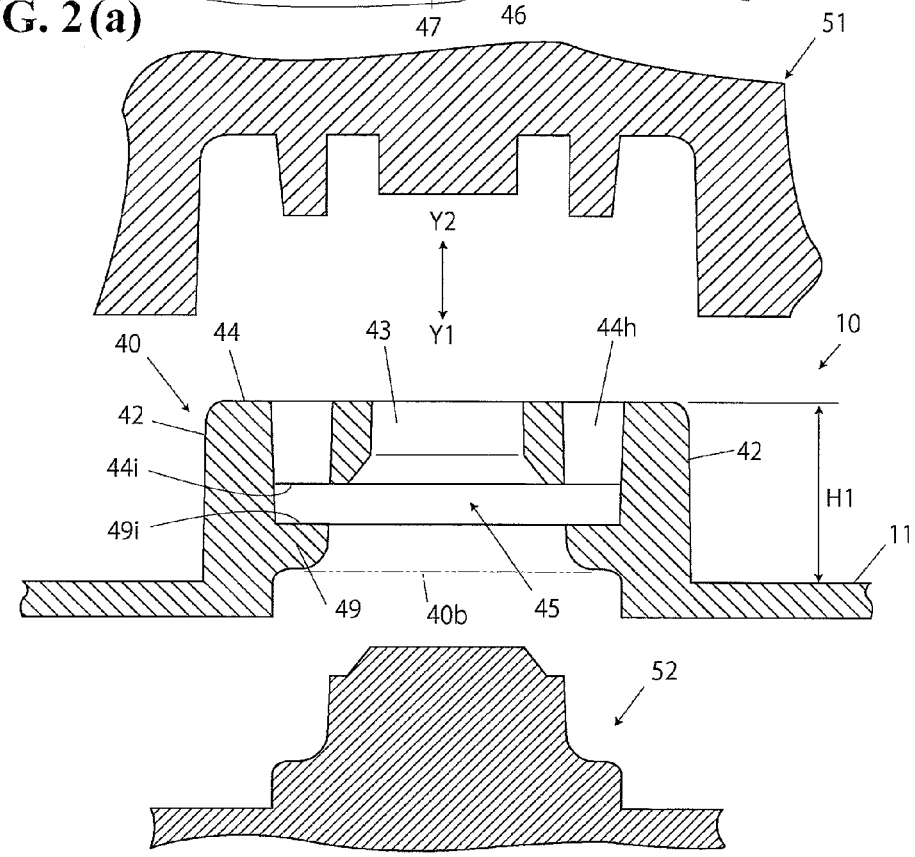
FIG. 2(b) illustrates a section taken along line b-b of FIG. 2(a) and fragmentary sections of molds at the same time.

As shown in FIGS. 2(a) and 2(b), in this embodiment, the lightening portions 44h are each provided in a substantially rectangular shape so as to overlap both the center 43o of the bolt through hole 43 and the restrictions 48 when viewed from the Z direction perpendicular to the insertion direction X of the nut.

Thus, the restrictions 48 become more deformable.

A pair of the restrictions 48 and a pair of the lightening portions 44h are provided so as to sandwich the communication portion 47 therebetween.

This configuration allows uniform deformation of the restrictions 48.

As shown in FIGS. 2(a) and 2(b), receiving portions 49 for receiving the radially enlarged portion 32 of the mounting component 30 are formed at locations (within the projected areas of the lightening portions 44h) overlapping the lightening portions 44h when viewed from the axial direction (the direction of arrow Y1 of FIG. 2(b)) of the bolt through hole 43.

With this configuration, the bolt through hole 43 and the lightening portions 44h can be molded at the same time by molding dies 51 and 52 (see FIG. 2(b)) that move in the axial direction of the bolt through hole 43, and the receiving portions 49 for receiving the radially enlarged portion 32 of the mounting component 30 can be also molded at the same time.

Furthermore, the portion other than the receiving portions 49 can be opened, thereby allowing a reduction in the weight of the first member 10.

For example as disclosed in JP-A No. 2011-122687, and also for example as shown by the virtual line 40b in FIG. 2(b) of this application, the receiving portions 49 for the mounting component 30 may be formed over the whole bottom of the holding portion 40.

However, such a configuration causes difficulty in molding and also causes an increase in the weight of the first member 10.

On the other hand, according to this embodiment, the bolt through hole 43 and the lightening portions 44h can be molded at the same time by the molding dies 51 and 52 (see FIG. 2(b)) that move in the axial direction of the bolt through hole 43, and the receiving portions 49 for receiving the radially enlarged portion 32 of the mounting component 30 can be also molded at the same time. Furthermore, the bottom (40b) of the holding portion other than the receiving portions 49 can be made open, thereby allowing a reduction in the weight of the first member 10.

As shown in FIG. 2(b), in the housing space 45 of the holding portion 40, the position in the height direction (the direction of arrow Y1-Y2) of the radially enlarged portion 32 of the mounting component 30 is restricted by an inside surface 44i of the seat portion 44 and inside surfaces 49i of the receiving portions 49.

This configuration eliminates the need for a shelf portion, such as the L-shaped supporting pieces (18, 18) in JP-A No. 2011-122687, thereby accordingly allowing a reduction in the height H1 (the size in the direction of the arrow Y1-Y2) of the holding portion 40.

Therefore, for example as shown in FIG. 4, if the first member 10 and the second member 20 are arranged below a seat 2, the seat height is lowered, thereby allowing an improvement in foot grounding property.

Figure 1B:
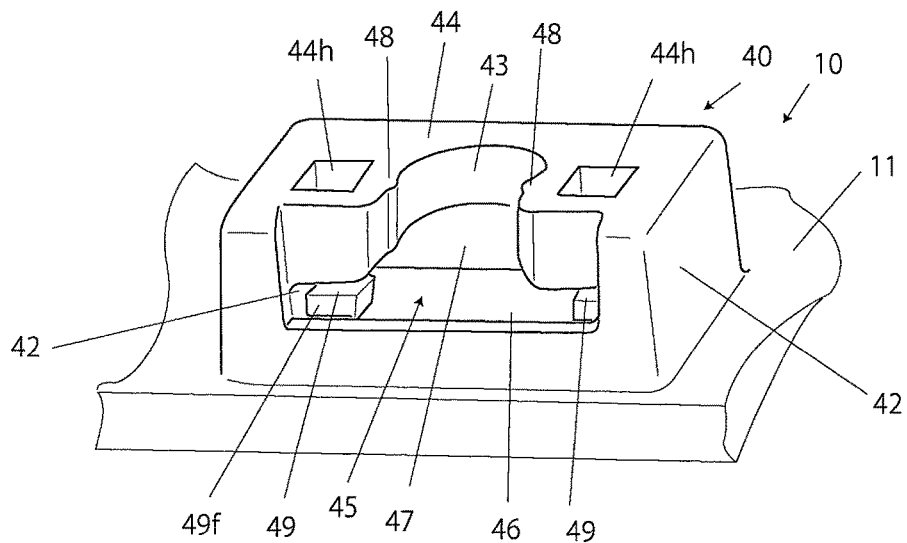

As shown in FIG. 1(b), front surfaces 49f of the receiving portions 49 are tapered so as to guide the radially enlarged portion 32 of the mounting component 30 at the time of insertion of the mounting component 30 into the housing space 45.

As shown in FIGS. 1(a), 3(a) and 3(b), the radially enlarged portion 32 of the mounting component 30 is a rectangular square nut, and the side wall portion 42 is disposed along three sides 32s of the square nut.

With this configuration, the rotation of the mounting component 30 is restricted by three sides (side wall inner surfaces 42i) of the side wall, and thus the co-rotation of the mounting component 30 at the time of bolt fastening work can be excellently prevented.

Figure 5:
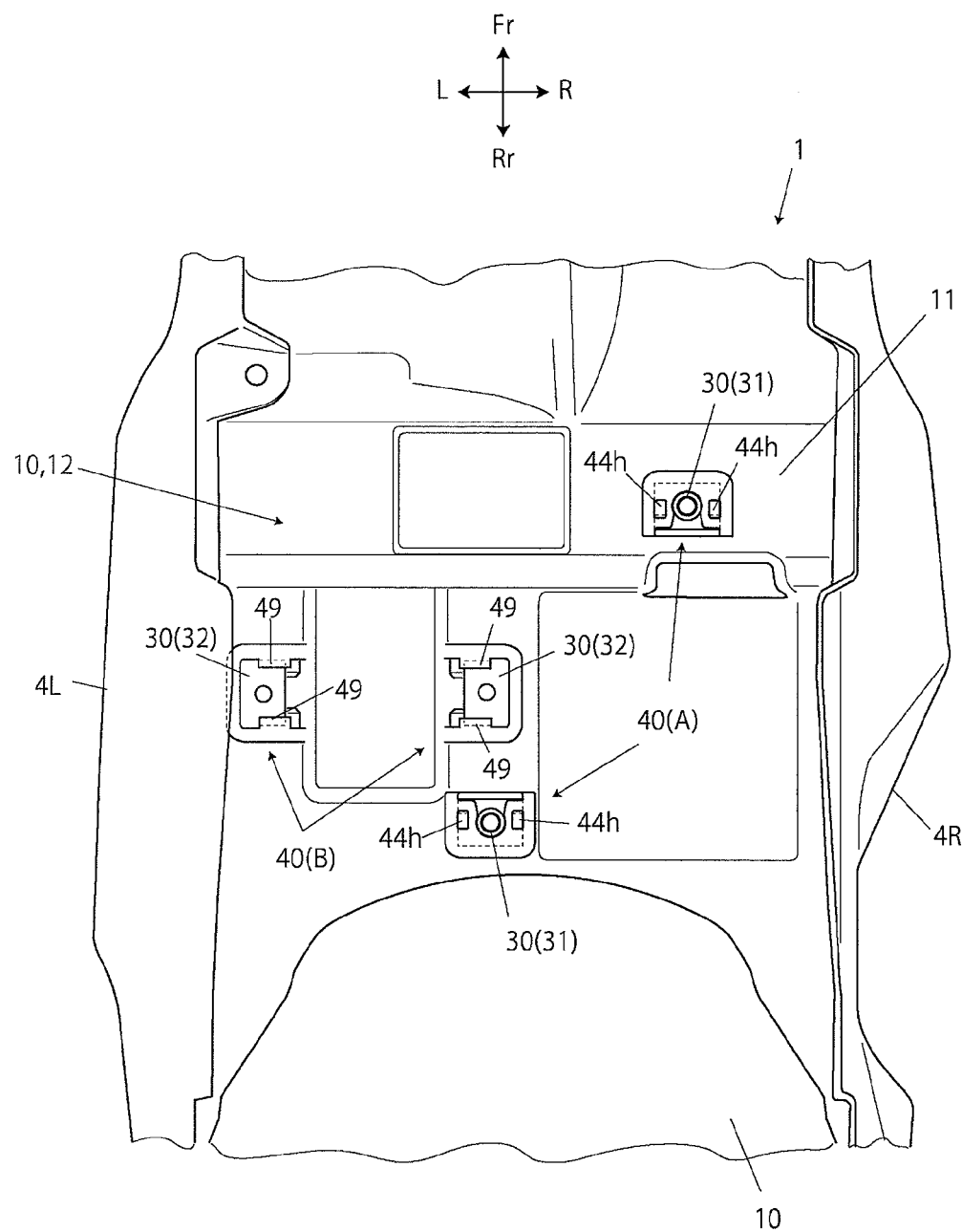
FIG. 5 is a view of the essential parts of the vehicle as viewed from above.
Figure 6:
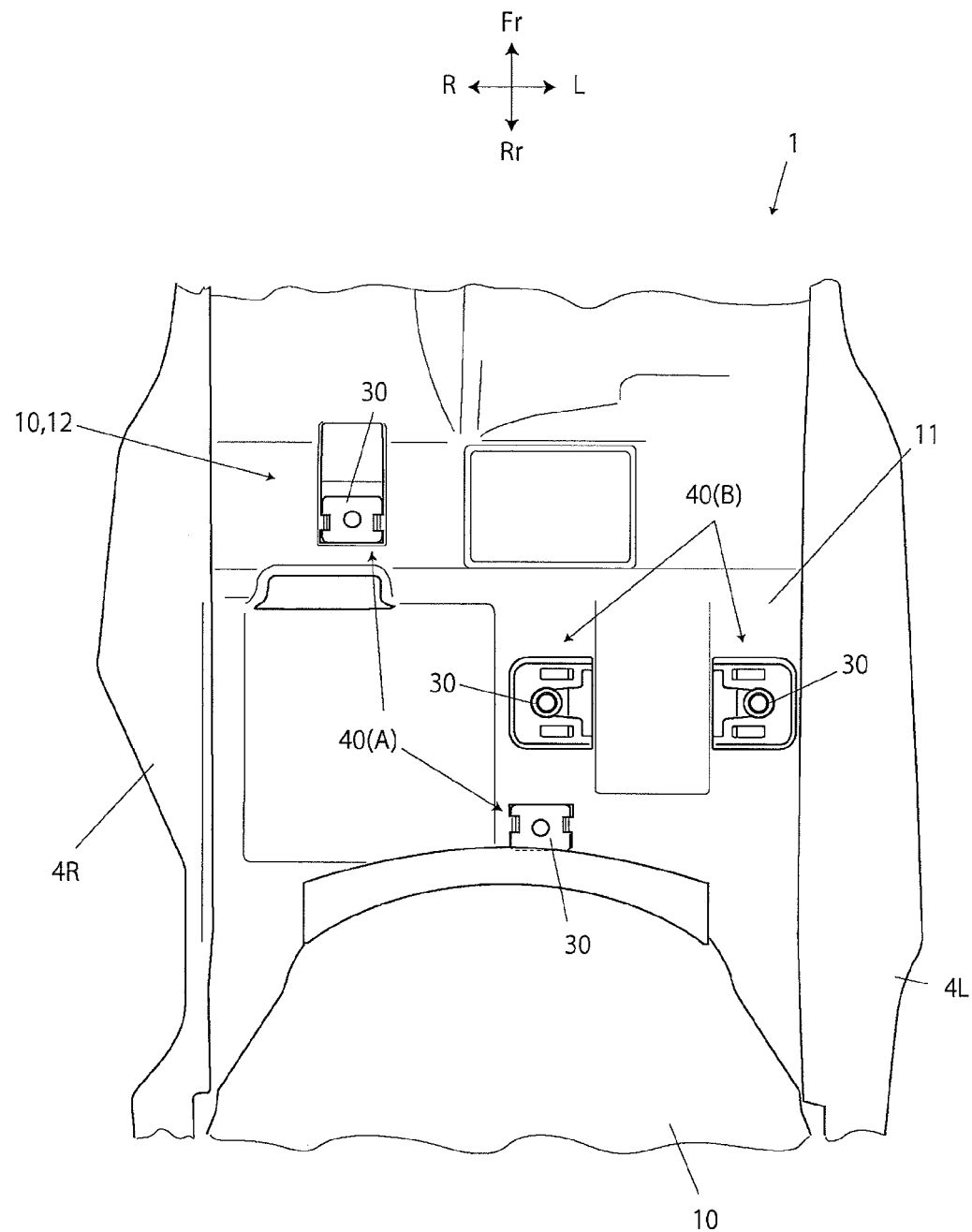
FIG. 6 is a view of the essential parts of the vehicle as viewed from below.

As shown in FIGS. 4 to 6, the first member 10 may be configured so that the holding portions 40 (A and B) are formed on front and back surfaces of the base portion 11 and disposed below the seat 2 of a saddle-ride type vehicle 1, and the electric components 20 (A and B) serving as the second member are mounted on the front and back surfaces.

Thus, the distributed arrangement between the front surface and back surface of the base portion 11 depending on the electric component is facilitated.

The first member 10 shown in FIGS. 4 to 6 is a synthetic-resin rear fender covering the top of a rear wheel Wr. As shown in FIG. 4, the base portion 11 is integrally provided at a front portion 12 of the rear fender (10), and the ABS modulator 20(A) and regulator 20(B) serving as electric components are mounted thereon.

In FIGS. 5 and 6, holding portions 40(A) are provided for mounting the ABS modulator 20(A), which are provided on the front surfaces of the base portion 11. Holding portions 40(B) are provided for mounting the regulator 20(B), which are provided on the back surfaces of the base portion 11.

In FIG. 4, a fuel tank 3, and left and right side covers 4L and 4R are provided.

Up to this point the embodiment according to the present invention has been described, but the present invention is not limited to the aforementioned embodiment and various modifications can be optionally made within the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A mounting structure for a mounting component, comprising:
   a cylindrical portion with a radially enlarged portion radially enlarged at one end of the cylindrical portion of the mounting component; and
   a first member including a holding portion for holding the mounting component and to which a second member is mounted by the mounting component,
   the holding portion being provided with:
   a housing space for the mounting component, the housing space being formed with a base portion, a side wall portion upstanding from the base portion, and a seat portion being continuous with a top of the side wall portion and having a bolt through hole into which a bolt is inserted; and
   a mounting component insertion hole provided in the side wall portion for inserting the mounting component into the housing space, wherein the bolt through hole abuts on a peripheral surface of the cylindrical portion of the mounting component, and the holding portion is provided with:

a communication portion for providing communication between the bolt through hole and the mounting component insertion hole, for allowing passage of the cylindrical portion of the mounting component into the bolt through hole; and restrictions for forming a narrow portion in the communication portion, the narrow portion being narrower than an outer dimension of the cylindrical portion of the mounting components;

wherein the seat portion is provided with lightening portions close to the restrictions and receiving portions, for receiving the radially enlarged portion of the mounting component, are formed at locations overlapping the lightening portions when viewed from an axial direction of the bolt through hole.

2. The mounting structure for the mounting component according to claim 1, wherein a pair of the restrictions and a pair of the lightening portions are provided so as to sandwich the communication portion therebetween.

3. The mounting structure for the mounting component according to claim 2, wherein the radially enlarged portion of the mounting component is a rectangular square nut, and the side wall portion is disposed along three sides of the square nut.

4. The mounting structure for the mounting component according to claim 2, wherein in the first member, the holding portions are formed on front and back surfaces of the base portion and disposed below a seat of a saddle-ride type vehicle, and electric components serving as the second member are mounted on the front and back surfaces.

5. The mounting structure for the mounting component according to claim 1, wherein in the housing space, the position in the height direction of the radially enlarged portion of the mounting component is restricted by an inside surface of the seat portion and inside surfaces of the receiving portions.

6. The mounting structure for the mounting component according to claim 5, wherein the radially enlarged portion of the mounting component is a rectangular square nut, and the side wall portion is disposed along three sides of the square nut.

7. The mounting structure for the mounting component according to claim 5, wherein in the first member, the holding portions are formed on front and back surfaces of the base portion and disposed below a seat of a saddle-ride type vehicle, and electric components serving as the second member are mounted on the front and back surfaces.

8. The mounting structure for the mounting component according to claim 1, wherein the radially enlarged portion of the mounting component is a rectangular square nut, and the side wall portion is disposed along three sides of the square nut.

9. The mounting structure for the mounting component according to claim 1, wherein in the first member, the holding portions are formed on front and back surfaces of the base portion and disposed below a seat of a saddle-ride type vehicle, and electric components serving as the second member are mounted on the front and back surfaces.

10. A mounting structure for a mounting component, comprising:

a cylindrical portion having a radially enlarged portion at one end of the cylindrical portion of the mounting component; and a first member, said first member including a holding portion for holding the mounting component;

the holding portion including:

a housing space for the mounting component, the housing space being formed with a base portion, a side wall portion upstanding from the base portion, and a seat portion being continuous with a top of the side wall portion and having a bolt through hole into which a bolt is inserted, said bolt through hole abuts on a peripheral surface of the cylindrical portion of the mounting component; and a mounting component insertion hole provided in the side wall portion for inserting the mounting component into the housing space;

a communication portion communicating between the bolt through hole and the mounting component insertion hole, for allowing passage of the cylindrical portion of the mounting component into the bolt through hole; and restrictions for forming a narrow portion in the communication portion, the narrow portion being narrower than an outer dimension of the cylindrical portion of the mounting component;

wherein the seat portion is provided with lightening portions close to the restrictions and receiving portions, for receiving the radially enlarged portion of the mounting component, are formed at locations overlapping the lightening portions when viewed from an axial direction of the bolt through hole.

11. The mounting structure for the mounting component according claim 10, wherein a pair of the restrictions and a pair of the lightening portions are provided so as to sandwich the communication portion therebetween.

12. The mounting structure for the mounting component according to claim 10, wherein in the housing space, the position in the height direction of the radially enlarged portion of the mounting component is restricted by an inside surface of the seat portion and inside surfaces of the receiving portions.

* * * * *